United States Patent [19]

Morse et al.

[11] Patent Number: 5,590,260
[45] Date of Patent: Dec. 31, 1996

[54] METHOD AND APPARATUS FOR OPTIMIZING THE DISPLAY OF FONTS IN A DATA PROCESSING SYSTEM

[75] Inventors: Gary J. Morse, Boca Raton; Stephen P. Thompson, Delray Beach, both of Fla.

[73] Assignee: International Business Machines Corporation, Armonk, N.Y.

[21] Appl. No.: 176,155

[22] Filed: Dec. 30, 1993

[51] Int. Cl.$^6$ .................................................. G06T 11/00
[52] U.S. Cl. .......................................... 395/167; 345/192
[58] Field of Search .................................. 395/150, 151, 395/144; 345/192–195

[56]  References Cited

U.S. PATENT DOCUMENTS

| | | | |
|---|---|---|---|
| 4,251,871 | 2/1981 | Yu | 364/518 |
| 4,345,245 | 8/1982 | Vella et al. . | |
| 4,486,856 | 12/1984 | Heckel et al. | 364/900 |
| 4,918,429 | 4/1990 | Clarke | 340/790 |
| 4,987,550 | 1/1991 | Leonard et al. | 364/521 |
| 5,001,653 | 3/1991 | Buchanan et al. | 364/523 |
| 5,138,696 | 8/1992 | Nagata | 395/110 |
| 5,162,784 | 11/1992 | Guttag et al. | 340/724 |
| 5,164,831 | 11/1992 | Kuchta et al. | 358/209 |
| 5,175,811 | 12/1992 | Sone et al. | 395/150 |
| 5,201,035 | 4/1993 | Stytz et al. | 395/163 |
| 5,208,908 | 5/1993 | Harrison et al. | 395/150 |
| 5,224,038 | 6/1993 | Bespalko | 364/419 |
| 5,226,116 | 7/1993 | Sasaki | 395/150 |
| 5,237,655 | 8/1993 | Statt et al. | 395/162 |
| 5,317,684 | 5/1994 | Penna . | |
| 5,335,322 | 8/1994 | Mattison | 395/164 |
| 5,388,207 | 2/1995 | Chia et al. | 395/164 |

OTHER PUBLICATIONS

Ralston et al. "Encyclopedia of Computer Science" 3rd Ed., Van Nostrand Reinhold, pub. prior to Apr. 7, 1993, pp. 850–853.
Leventhal, Lance A. "8080A/8085 Assembly Language Programming" Osborne/McGraw–Hill, 1978 pp. 3–51 and 3–52.
Browne et al. "The McGraw–Hill Computer Handbook", McGraw–Hill Inc., 1983 pp. 20–25.

Primary Examiner—Mark K. Zimmerman
Assistant Examiner—Rudolph Buchel
Attorney, Agent, or Firm—Duke W. Yee

[57]  ABSTRACT

A method and system for increasing efficiency in the display of characters on a display within a data processing system, wherein the data processing system includes a system memory and a graphics adapter, the system memory having a page mode. A plurality of characters are stored in the system memory as a plurality of glyph bitmaps. Each character has a width, and each glyph bitmap for a character is arranged as a plurality of scanlines such that each of the scanlines includes the width of the character. Selected glyph bitmaps are transmitted from the system memory to the graphics adapter, wherein an occurrence of breaks in the page mode are minimized when the selected glyph bitmaps are moved from the system memory to the graphics adapter, increasing efficiency in displaying characters on a display.

35 Claims, 14 Drawing Sheets

|  | column 1 | | | | | | | | column 2 | | |
|---|---|---|---|---|---|---|---|---|---|---|---|
|  | 7 | 6 | 5 | 4 | 3 | 2 | 1 | 0 | 7 | 6 | 5 |
| scan 0 |  |  |  |  |  |  |  |  |  |  |  |
| scan 1 |  |  |  |  | X | X |  |  |  |  |  |
| scan 2 |  |  |  | X |  |  | X |  |  |  |  |
| scan 3 |  |  | X |  |  |  |  | X |  |  |  |
| scan 4 |  | X |  |  |  |  |  |  | X |  |  |
| scan 5 |  | X |  |  |  |  |  |  | X |  |  |
| scan 6 |  | X |  |  |  |  |  |  | X |  |  |
| scan 7 |  | X | X | X | X | X | X | X | X |  |  |
| scan 8 |  | X |  |  |  |  |  |  | X |  |  |
| scan 9 |  | X |  |  |  |  |  |  | X |  |  |
| scan 10 |  | X |  |  |  |  |  |  | X |  |  |
| scan 11 |  |  |  |  |  |  |  |  |  |  |  |
| scan 12 |  |  |  |  |  |  |  |  |  |  |  |
| scan 13 |  |  |  |  |  |  |  |  |  |  |  |

Op code - REGISTER

| F | F | 0 | 0 | X | X | X | X | Data | |
|---|---|---|---|---|---|---|---|------|---|
| 0 | 1 | 2 | 3 | 4 | 5 | 6 | 7 | Nibble Position | |

~650

Destination X - REGISTER

| 0 | 1 | 0 | 0 | Data |
|---|---|---|---|------|
| 0 | 1 | 2 | 3 | Nibble Position |

~652

Destination Y - REGISTER

| 0 | 1 | 5 | 0 | Data |
|---|---|---|---|------|
| 0 | 1 | 2 | 3 | Nibble Position |

~654

Number of Characters - REGISTER

| 0 | 0 | 1 | 0 | Data |
|---|---|---|---|------|
| 0 | 1 | 2 | 3 | Nibble Position |

~656

Glyph Height - REGISTER

| 0 | 0 | 0 | F | Data |
|---|---|---|---|------|
| 0 | 1 | 2 | 3 | Nibble Position |

~658

Glyph Width + Intercharacter Spacing - REGISTER

| 0 | 0 | 0 | F | Data |
|---|---|---|---|------|
| 0 | 1 | 2 | 3 | Nibble Position |

METHOD AND APPARATUS FOR OPTIMIZING THE DISPLAY OF FONTS IN A DATA PROCESSING SYSTEM

CROSS-REFERENCE TO RELATED APPLICATION

The present application is related to U.S. patent application Ser. No. 08/175,901, entitled "Method and Apparatus For Optimizing The Display Of Fonts In A Data Processing System", attorney docket BC9-93-071, filed of even date herewith by the inventors hereof, assigned to the assignee herein, and incorporated herein by reference.

BACKGROUND OF THE INVENTION

1. Technical Field

The present invention relates generally to an improved data processing system, and in particular to an improved method and apparatus for a graphics display system in a data processing system. Still more particularly, the present invention relates to an improved method and apparatus for displaying characters on a video display in a data processing system.

2. Description of the Related Art

Today's operating systems, such as OS/2, Windows, and AIX, use a graphic user interface (GUI) to provide an improved interface between a user and a computer. "OS/2" and "AIX" are trademarks of International Business Machines Corporation. "Windows" is a trademark of Microsoft Corporation. A GUI allows an application to utilize both text and graphics on a single display screen. Characters may be presented on a display screen in different fonts. The term "character", as utilized in this specification means a member of a set of elements that is used for the representation, organization, or control data. The term "font" means a family of characters having a given size and style; for example, 12-point Helvetica is a font.

In addition, a GUI may allow multiple applications to share the same screen by assigning each application a rectangular potion of the screen, called a window. Areas outside of the window are usually not available to the application. A user may resize and reposition each application window as desired. The GUI also allows an application, such as a word processor to operate in a WYSIWYG (What-You-See-Is-What-You-Get) mode. Even though the GUI environment operates the display in a graphics mode, text support is still an important part of the GUI. When a display adapter operates in a graphics mode, each picture element (pal) of the character must be drawn by the GUI. Such a situation presents a serious drain on performance because of the software overhead associated with drawing all of the pels instead of just writing a single character code to the display adapter. In addition to drawing the character, a GUI supports logical operations between the source data (text character or image bitmap) and the destination (usually the screen). These logical operations are also called "raster-ops" and increase the overhead required for drawing text characters. Many different configurations of hardware and software may be employed in a data processing system.

Currently, graphics adapters render raster fonts to the display screen by performing a character at a time block transfer from a font cached in off screen memory through a color expansion to the screen. Fonts are currently handled in a two-pass operation, where the first pass transfer the character to the screen and the second pass transfers the inter-character spacing to the screen. Such a system is inefficient because characters stored in off-screen memory must alternate accesses of the frame buffer, which reduces the effective bandwidth available for rendering the fonts. Second, the block transfer of the character interspace is a separate operation having overhead to set up. The transfer of the character interspace results in low performance because a graphics adapter breaks out of memory page mode often because the interspace area is usually narrow and tall in shape.

Therefore, it would be advantageous to have a method and apparatus for efficiently displaying characters on a display.

SUMMARY OF THE INVENTION

It is therefore one object of the present invention to provide an improved data processing system.

It is another object of the present invention to provide an improved method and apparatus for a graphics display system in a data processing system.

It is yet another object of the present invention to provide an improved method and apparatus for displaying characters on a video display in a data processing system.

The foregoing objects are achieved as is now described. The present invention provides a method and system for increasing efficiency in the display of characters on a display within a data processing system, wherein the data processing system includes a system memory and a graphics adapter, the display memory has both page mode and non page mode accesses. A plurality of characters are stored in the system memory as a plurality of glyph bitmaps. Each character has a width, and each glyph bitmap for a character is arranged as a plurality of scanlines such that each of the scanlines includes the width of the character. Selected glyph bitmaps are transmitted from the system memory to the graphics adapter, wherein an occurrence of breaks in the page mode are minimized when the selected glyph bitmaps are moved from the system memory to the graphics adapter, increasing efficiency in displaying characters on a display.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 16 is a diagram of registers utilized by a graphics adapter to process characters in accordance with a preferred embodiment of the present invention.

DETAILED DESCRIPTION OF PREFERRED EMBODIMENT

Figure 1:
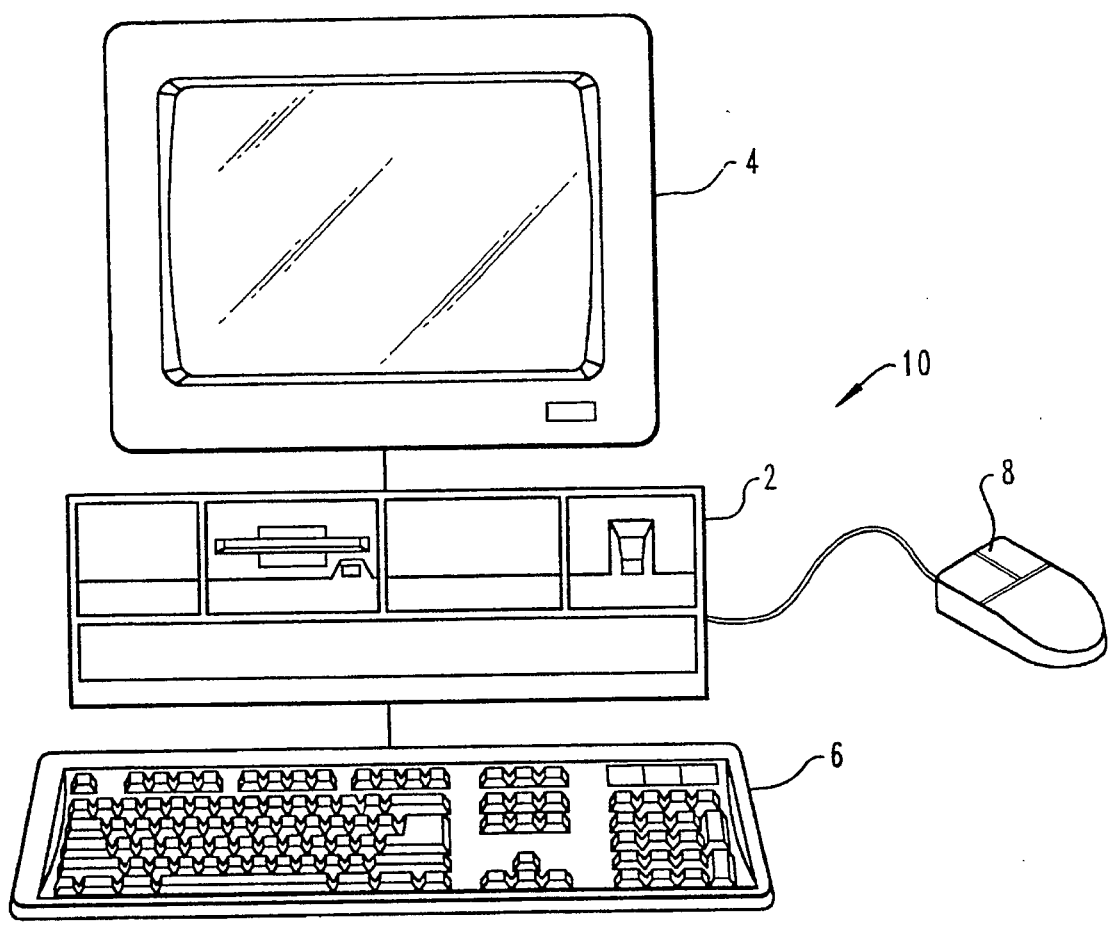
FIG. 1 depicts an illustration of a data processing system in which a preferred embodiment of the present invention may be implemented.

With reference to the figures and in particular with reference to FIG. 1, a data processing system 10 is depicted which includes a system unit 2, a video display terminal 4, a keyboard 6, and a mouse 8. Data processing system 10 may be implemented utilizing any suitable computer, such as an IBM PS/2 or IBM RISC SYSTEM/6000 computer, products of International Business Machines Corporation, located in Armonk, N.Y. "PS/2" and "RISC SYSTEM/6000" are trademarks of International Business Machines Corporation. Although the depicted embodiment is a personal computer, a preferred embodiment of the present invention may be implemented in other types of data processing systems, such as, for example, intelligent work stations or mini computers.

Figure 2A:
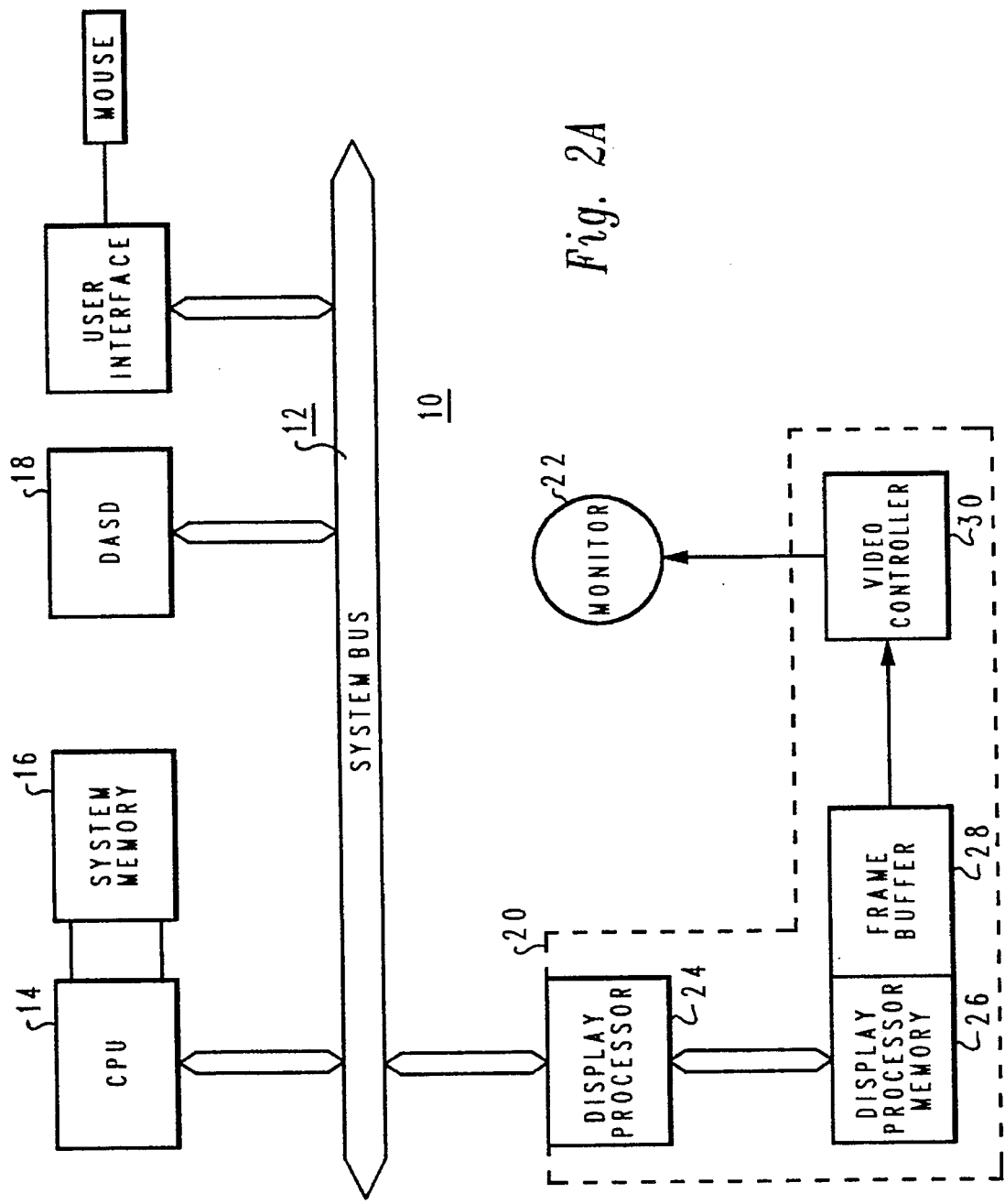
FIGS. 2A and 2B are block diagrams of the data processing system of FIG. 1 in accordance with a preferred embodiment of the present invention.

Referring next to FIG. 2A, a block diagram of a data processing system 10 is depicted in which a preferred embodiment of the present invention may be utilized. System bus 12 provides a connection between various components within data processing system 10. Central processing unit (CPU) 14 may include one or more processors, such as an 80486 processor or a Pentium processor available from Intel Corporation in Santa Clara, Calif. "Pentium" is a trademark of Intel Corporation.

System memory 16 provides storage for data processing system 10 and may include both read only memory (ROM) and random access memory (RAM). System memory 16 typically holds data plus programs that execute on CPU 14, such as, for example, an application, a graphics package, and an operating system. Direct access storage device (DASD) 18 provides additional storage for data processing system 10. DASD 18 typically provides long term storage for data processing system 10. DASD 18 may include, for example, a hard disk drive and/or a floppy disk drive. Graphics adapter 20 is employed to display a GUI to a user on monitor 22.

Graphics adapter 20 includes a graphics processor 24, graphics processor memory 26, frame buffer 28, and video controller 30. Graphics processor 20 performs graphics functions, such as scan conversion and raster operations. Graphics processor memory 26 holds data plus programs that perform functions, such as scan conversion and raster operations. Frame buffer 28 includes video memory also called VRAM. Frame buffer 28 contains the displayable image created by the scan conversion and raster operations.

Figure 2B:
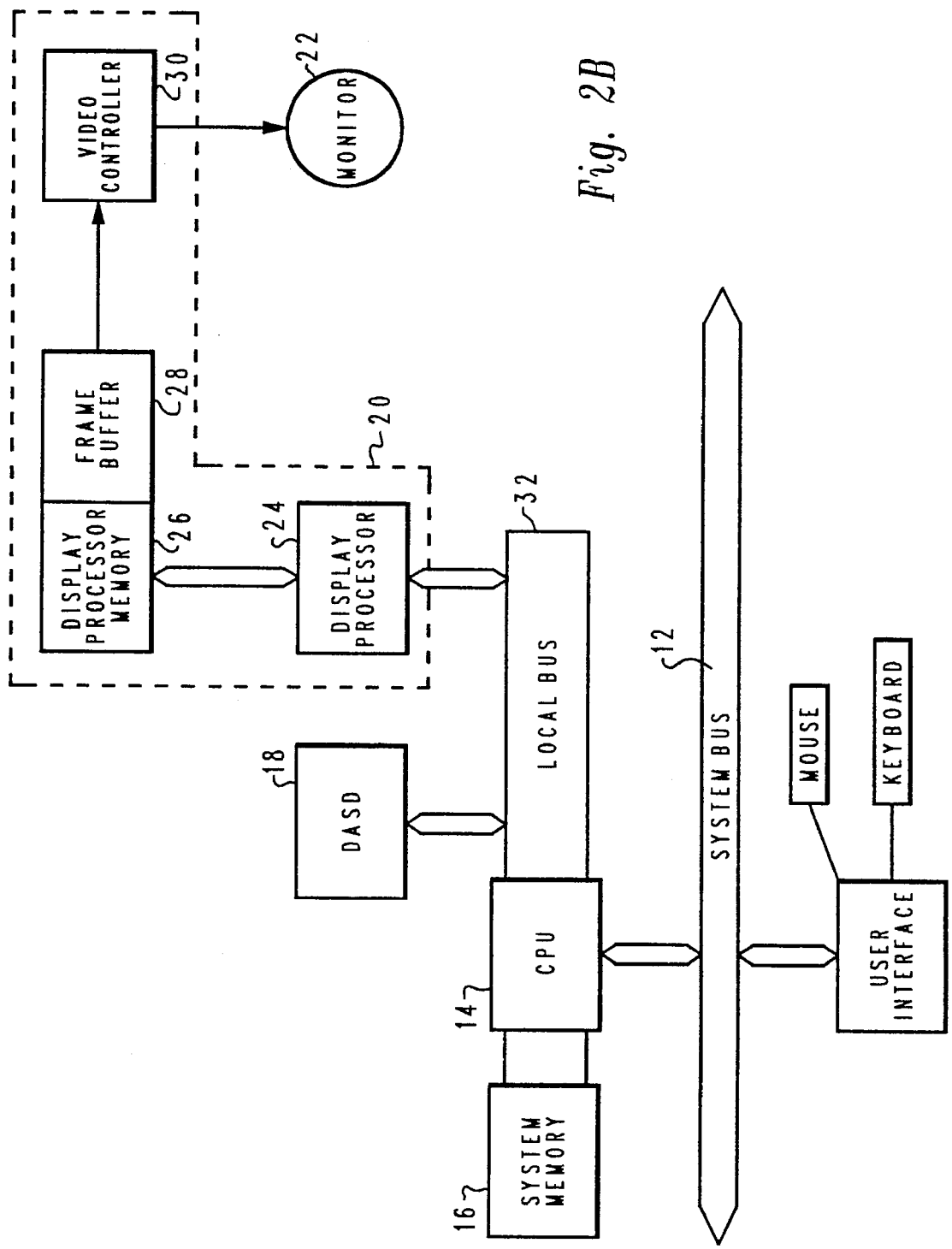

Alternatively, data processing system 10, as depicted in FIG. 2B, may include a local bus 32, which is a direct extension of the CPU 14's lines and operates on the same clock as the CPU 14. Local bus 32 provides 32 or 64 bit transfers to devices attached to local bus 32. In addition system memory 16 may be connected to CPU 14 via 32 or 64 bit paths. In such a system, DASD 18 and graphics adapter 20 are connected to local bus 32 to provide increased performance to data processing system 10.

The data processing systems illustrated in FIGS. 1, 2A, and 2B may be programmed with software incorporating the processes depicted below.

The present invention provides a method and apparatus for selecting a font processing procedure to optimize the performance of the data processing system in which the font processing procedure is to be utilized. According to the present invention, the data processing system is analyzed or tested to determine the appropriate font processing procedure to employ, wherein the display of characters in the data processing system is optimized.

Various characteristics of the data processing system, such as the CPU type and cache characteristics, may be factors in determining the font processing procedure required to optimally display characters on a screen 31 in the data processing system. For example, in a data processing system with a slow CPU, a font processing procedure requiring large amounts of processing by the CPU to put font data in a format to allow the graphics adapter to perform optimally would be slowed by the software.

On the other hand, in a system having a very high performing CPU, the computing power of the CPU is wasted by employing a font processing procedure that results in the CPU finishing its tasks related to the processing of characters prior to the graphics adapter finishing its tasks. This situation is a "hardware limited" situation in which the CPU is always waiting for the hardware to be ready for the next command or data. A "software limited" situation exists when the font processing procedure cannot keep up with the hardware. To maximize performance of the data processing system, the font processing procedure selected should not have to wait for the hardware, and vice versa. In other words, the work load should be balanced between both hardware and software.

In presently available graphic adapter software utilized to process characters, it is not possible for hardware and software to completely overlap because of the font copying operation presently employed and because of the control interface of the graphics adapter. Typically, software must copy font information into off-screen video memory and then write the graphics adapter's control registers to initiate processing. Even if this is done while the graphics adapter is busy processing the previous character, the CPU ties up the video memory so that it cannot be utilized by the graphics adapter. In addition, current graphics adapters do not allow software to write into its control registers while the graphics adapter is performing an operation.

Figure 3:
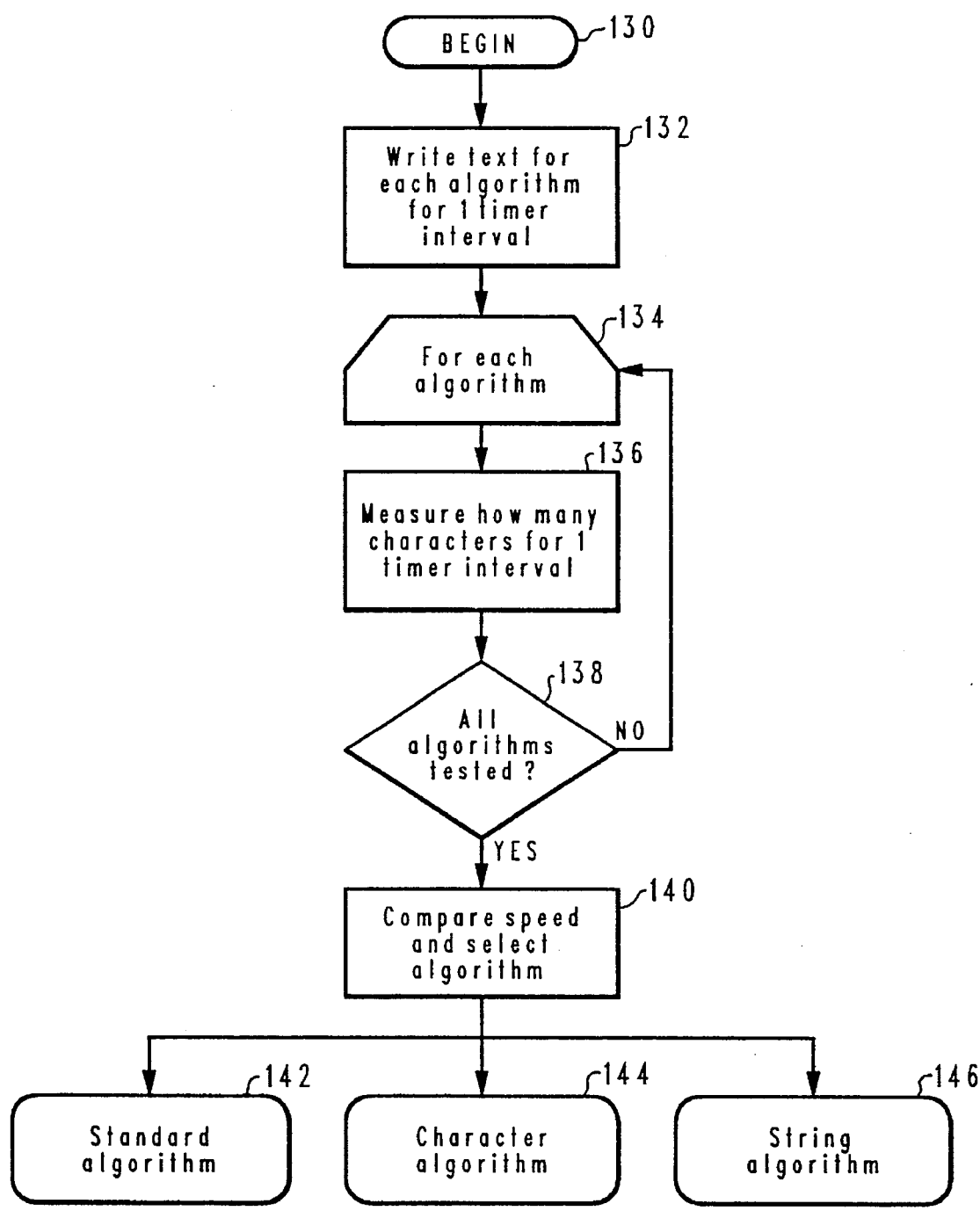
FIG. 3 depicts a flowchart of a process for selecting an optimal font handling procedure for a data processing system in accordance with a preferred embodiment of the present invention.

Referring to FIG. 3, a flowchart of a selection process for selecting an optimal font processing procedure is illustrated in accordance with a preferred embodiment of the present invention. The selection process selects a font rendering process that provides optimal font processing within the data processing system. The selection process is typically employed when a data processing system is first utilized. Additionally, this selection process may be employed when configurations in the data processing system are altered, such as, for example, a new graphics adapter is installed.

The process begins at block 130 and thereafter writes text for each process for 1 timer interval, as depicted in block 132. The timer interval is arbitrary in length but is determined by the algorithm to be a time interval which is allows repeatable accurate prediction of the capabilities of the CPU in doing the different font algorithms. Next, the process proceeds to block 134, which illustrates a return block. Then, a measurement of how many characters are processed for a timer interval is performed, as illustrated in block 136. Next, a determination of whether all of the font processes have been tested is made, as depicted in block 138. If all of the font processes have not been tested, the selection process returns to block 134 to test the next font process. Otherwise, the process continues to block 140, which depicts comparing the speed of each font process and selecting the fastest one.

The process terminates as illustrated in blocks 142, 144, or 146, depending on which process provided the best results. If the standard font process provided the best performance, the selection process terminates in block 142 with the selection of the standard font process. A determination that the character oriented process provides the best performance results in the selection procedure terminating in block 144 and if the string oriented process is the fastest, the process terminates in block 146 with the string oriented process being selected. Each of the three font processes require different amounts of CPU resources. The present invention selects the process that provides the fastest display of characters on the screen. Although the depicted embodiment utilizes three different font processes, other numbers of procedures may be utilized in accordance with a preferred embodiment of the present invention.

In particular, the preferred embodiments of the present invention may be employed in a GUI environment such as Microsoft Windows. A raster font is a font whose characters are represented as glyph bitmaps. These glyph bitmaps are stored in a data structure called a FONTINFO structure employed in MicroSoft Windows in accordance with a preferred embodiment of the present invention. These glyph bitmaps contain one bit for each pel of a character. The bit may represent the background color (value equals zero) or the foreground color (value equal one). The device driver for a graphics adapter typically retrieves the character width and glyph information from the FONTINFO structure.

The standard font process is known to those of ordinary skill in the art. The standard font process utilizes font information stored in a FONTINFO structure found in Windows. The standard font process retrieves character width and glyph information from the FONTINFO structure to create a character glyph bitmap. The term "glyph" means an image, usually of a character, in a font. The character glyph bitmap data, also called "font data" is a monochrome bitmap stored in 8-pel columns in accordance with a preferred embodiment of the resent invention.

Currently, text strings are rendered on a display by copying font data such as required character glyph bitmaps into an off-screen area of the memory in the frame buffer. A text string is a line of characters that are to be displayed. Then the graphics adapter copies the glyph bitmaps from the off-screen area of the memory in the graphics adapter to the destination (usually an area of on-screen memory in the frame buffer) one scanline at a time, until the entire character height is rendered. As the glyph bitmaps are copied, the graphics adapter maps a one bit-per-pel (bpp) pattern to the appropriate foreground and background colors required by the destination for the bpp. This process is called "color expansion". Color expansion is well known to those of ordinary skill in the art.

Figures 4, 6:
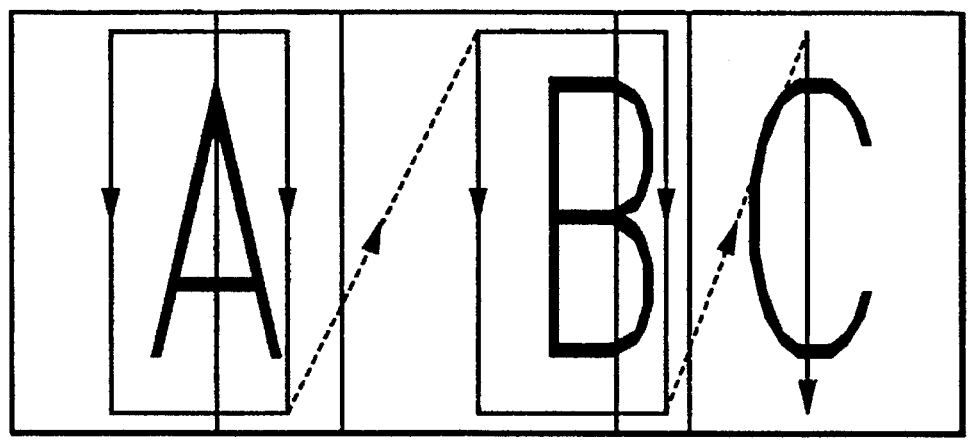
FIG. 4 is a diagram of pel data for the character "A" is depicted in accordance with a preferred embodiment of the present invention.
FIG. 6 is a illustration of a character oriented process for sending font data from system memory to the graphics adapter in accordance with a preferred embodiment of the present invention.

Referring to FIG. 4, a diagram of font data, also called glyph bitmap data, for the character "A" is depicted. The X's depict the pels in the character "A". Eight bit columns are concatenated until the entire width of the character is presented. As can be seen character "A" is wider than 8 pels. The byte pattern for character "A" is stored scanline by scanline from scan 0 to scan 13 in 8 bit sections. Scans 0–13 would be read in column 1 and then the data for the scanlines in column 2 would be read. Each column is read scanline by scanline from scan 0 to scan 13. Note that in this case the character "A" is not evenly divisible by 8.

Each time a new scanline is processed, a break in page mode occurs. "Page mode" is a mode in a dynamic RAM (DRAM) that writes adjacent addresses faster than randomly placed or nonadjacent addresses. Padding 0's are stored in the extra bit positions. If the width of the character is not divisible by eight, then padding 0's are stored in the extra bit positions. This type of storage format implies that for characters wider than eight pels, data for a single scanline is not stored in contiguous bits. For example, the byte pattern for the 12×14 pel "A" depicted in FIG. 4 would be:

| 00 | 0C | 12 | 21 | 40 | 40 | 40 | 7F | 40 | 40 | 40 | 00 | 00 | 00 |
|----|----|----|----|----|----|----|----|----|----|----|----|----|----|
| 00 | 00 | 00 | 00 | 80 | 80 | 80 | 80 | 80 | 80 | 80 | 00 | 00 | 00 |

Figure 5:
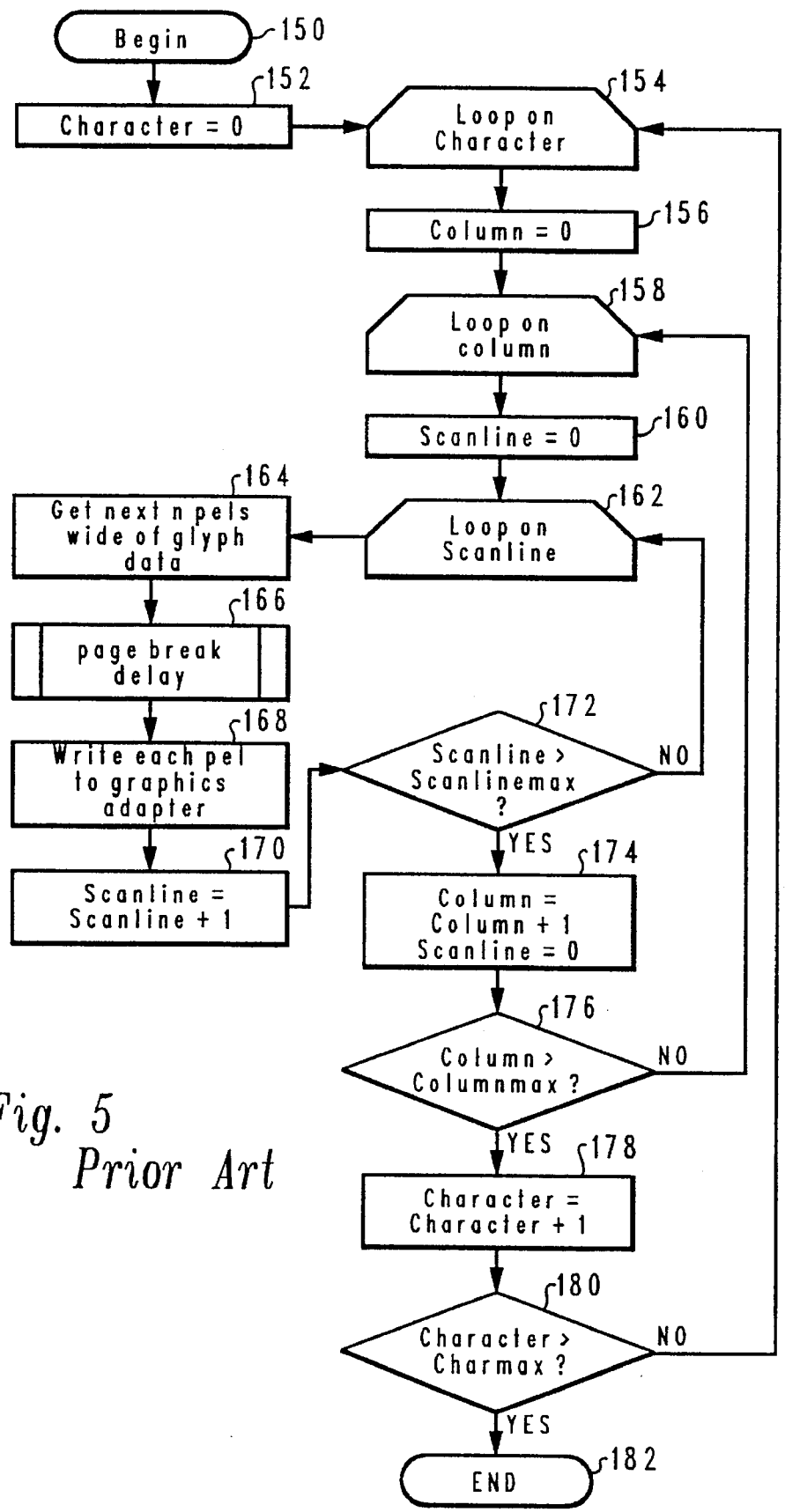
FIG. 5 depicts a flowchart of a standard font handling process known in the prior art.

Referring now to FIG. 5, a high level flowchart of a standard font process for sending font data to a graphic adapter is depicted in accordance with a preferred embodiment of the present invention. The process begins as illustrated in block 150 and thereafter the character variable is set equal to zero, as shown in block 152. Then, a return point for a decision block involving the character variable is depicted in block 154. In block 156, the column variable is set equal to zero. Next, block 158 is a return point for a decision block involving the Column variable. Scanline is set equal to zero, as illustrated in block 160.

The process then proceeds to block 162, which illustrates a return for a decision block involving the Scanline variable. The process then advances to block 164. Block 164 depicts obtaining the next n pels wide of glyph data from off-screen video memory in the frame buffer. Thereafter, a page break delay occurs, as depicted in block 166. This delay is caused by a break in the page mode in memory when a new scanline is read from the off-screen video memory in the frame buffer memory. A typical delay period for a page break is 80 nanoseconds. In this example, each pel is written at a rate of 40 nanoseconds per pel. The pels are written to the frame buffer of the graphics adapter, as illustrated in block 168. Then, Scanline is incremented by one, as depicted in block 170.

Next, a determination of whether Scanline is greater than Scanlinemax is made, as illustrated in block 172. If Scanline is not greater than Scanlinemax, the process returns to block 162. Otherwise, Column is incremented by one and Scanline is set to zero, as depicted in block 174. Subsequently, 176, a determination of whether Column is greater than Columnmax is performed, as illustrated in block 178. If Column is not greater than Columnmax, the process returns to block 158. Otherwise, Character is incremented by one, as depicted in block 178. Then, a determination is made as to whether Character is greater than Charmax, as illustrated in block 180. If Character is not greater than Charmax, then the process returns to block 154. Otherwise, the process terminates as depicted in block 182.

In accordance with a preferred embodiment of the present invention, the character oriented process will allow the CPU to intermix control and data information and send them directly to the graphics adapter. The graphics adapter interprets the control information and process the data as required. As glyph bitmaps are received at the graphics adapter, the graphics adapter will color expand and write the glyph bitmaps directly to the destination. As a result, the CPU is able to gather font information and send that information to the graphics adapter at the same time the graphics adapter is writing data that was previously received. Dynamic control information, such as character width and inter-character spacing, is intermixed with the font data. Static control information, such a string height and starting address, is sent to the graphics adapter via control registers.

System memory, rather than off-screen video memory in the frame buffer in the graphics adapter, is utilized for caching glyph bitmaps for the fonts in the character oriented process and the string oriented process in accordance with a preferred embodiment of the present invention. As a result, memory in the graphics adapter that was previously dedicated to the font cache may be employed to store other bitmap images, such as menu bar pull-downs or screen areas.

in particular, a character oriented process according to the present invention, utilizes the CPU to pre-process and cache glyph bitmaps in system memory instead of in memory in the graphics adapter as presently done in many graphics adapters. Glyph bitmaps are copied from the cache in system memory, scanline-by-scanline, and sent to the graphics adapter a character at a time to allow the graphics adapter to take advantage of the memory page mode operation. Each time a new scanline is processed, a break in the page mode occurs. The character oriented process provides quicker display of fonts because only one column of scanlines is utilized, rather than the two columns as employed by the standard font process.

Under the character oriented process, the CPU sends data to the graphics adapter using a data stream such as:
[WIDTH][SPACING][GLYPH SCANLINE 1][GLYPH SCANLINE 2] . . . [GLYPH SCANLINE N][WIDTH] . . .
where WIDTH is the width of the character in pels; SPACING is the inter-character spacing between the one character and the next character; and GLYPH SCANLINE 1-N is glyph bitmap data for a character sent in bytes (or words or dwords) containing the number of bits specified by WIDTH. WIDTH and SPACING needs to be sent only before the first character is sent to the graphics adapter. WIDTH and SPACING are sent again only if the width of the character or the inter-character spacing changes. This process is continued until the entire string of characters is rendered on the display to the user.

The glyph bitmap data is sent to the graphics adapter on a scanline basis in data units that are identical in length. Utilizing a preferred embodiment of the present invention, the graphics adapter only utilizes the appropriate number of bits out of the data sent, allowing the CPU to use efficient data move instructions such as REP MOVSD, which is an assembly language instruction known to those of ordinary skill in the art. The present example uses 32 bits, a dword, as the width of a scanline for the character oriented process because Intel CPUs, such as the 80386 and 80486, handle dwords efficiently.

According to a preferred embodiment of the present invention, any data width involving a permanent move instruction in the CPU that can be employed to move an entire scanline may be utilized; i.e., a word. The glyph bitmaps may be stored in a cache (set up in system memory) as true bitmaps, not in column format as employed in a FONTINFO structure utilized in Windows. As a result, the CPU may employ a REP MOVSD instruction to efficiently copy glyph bitmap data arranged in dword wide scanlines to the graphics adapter.

As can be seen with reference to FIG. 6, the character "A" is first sent to the graphics adapter and thereafter, character "B" is sent to the graphics adapter. Character "C" is the third character displayed according to the present invention. The entire width of a character is sent in each scanline rather that in multiple columns as illustrated in FIG. 4. The utilization of a single column of scanlines provides faster processing of font data.

This character oriented process allows the graphics adapter to maintain page mode for the entire width of a character plus the inter-character spacing (assuming the memory addressed does not cross a page boundary and that the graphics adapter is not interrupted). The increased use of the page mode improves hardware performance in accordance with a preferred embodiment of the present invention.

Figure 7:
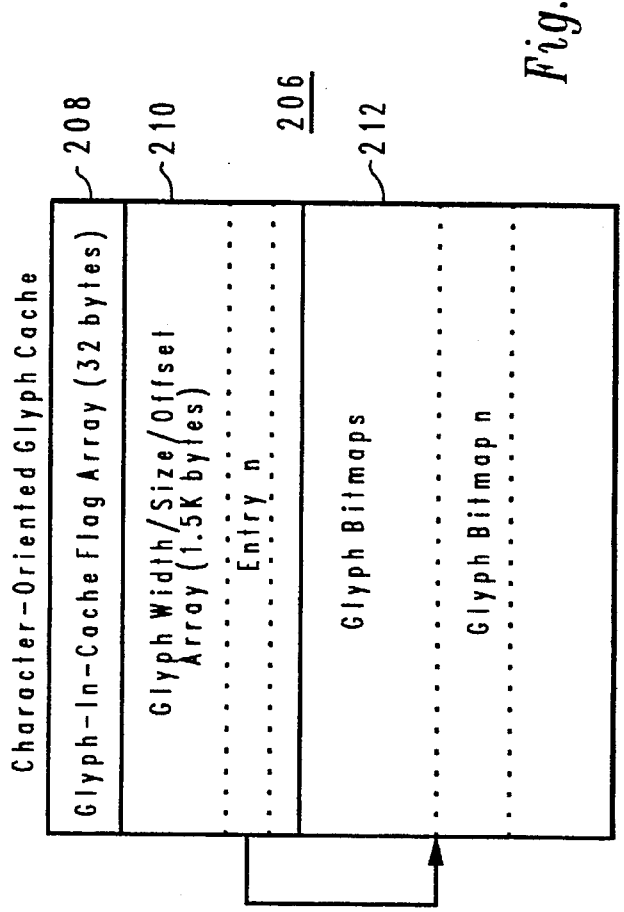
FIG. 7 depicts a block diagram of glyph bitmaps stored in system memory in accordance with a preferred embodiment of the present invention.

Referring now to FIG. 7, a cache data structure 206 in system memory, which includes three sections of data is illustrated in accordance with a preferred embodiment of the present invention. Section 208 is a 256-entry 1-bit array containing flags that indicate whether a particular character is cached. Section 210 is a 256-entry 6-bit array that contains data such as character widths, bitmap sizes in dwords, and pointers to the bitmap for particular characters. Section 212 contains glyph bitmaps for the characters. Entry "n" in section 210 maps to glyph bitmap "n" in section 212. Those of ordinary skill in the art will realize other cache configurations may be employed in accordance with a preferred embodiment of the present invention.

Figure 8:
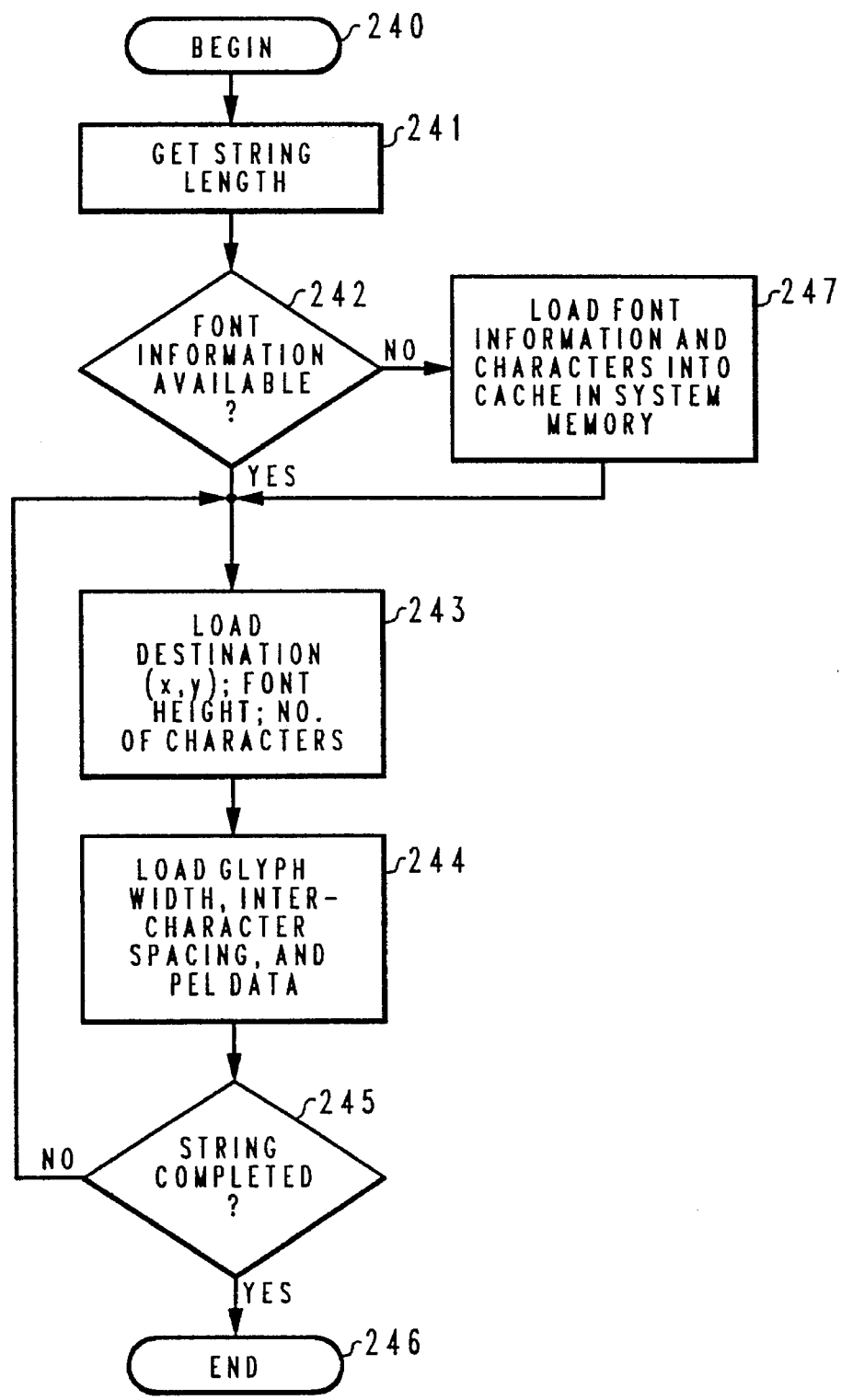
FIG. 8 is a flowchart of a character oriented process for displaying characters on a display screen accordance with a preferred embodiment of the present invention.

With reference to FIG. 8, a flowchart of a character oriented process is illustrated in accordance with a preferred embodiment of the present invention. The process begins as illustrated in block 240 and obtains the string length, as illustrated in block 241. Thereafter, a determination is made as to whether font information is available, as depicted in block 242. If font information is available, the process then loads data indicating the Destination (x,y), Font Height, and Number of Characters into registers in the graphics adapter, as illustrated in block 243. Thereafter, data for character Glyph Width, Inter-character Spacing, and pels is sent to the graphics adapter, as illustrated in block 244. Subsequently, a determination of whether the string has been finished is made, as depicted in block 245. The process iteratively returns to block 243 until the string is finished. Upon completion of the string, the process terminates, as illustrated in block 246. A "string" is an entire line of characters that are to be displayed on a display in accordance with a preferred embodiment of the present invention.

Referring back to block 242, if font information is not available, the process loads the font information and places the glyph bitmaps for the characters into the cache in system memory, as illustrated in block 247.

Figure 9:
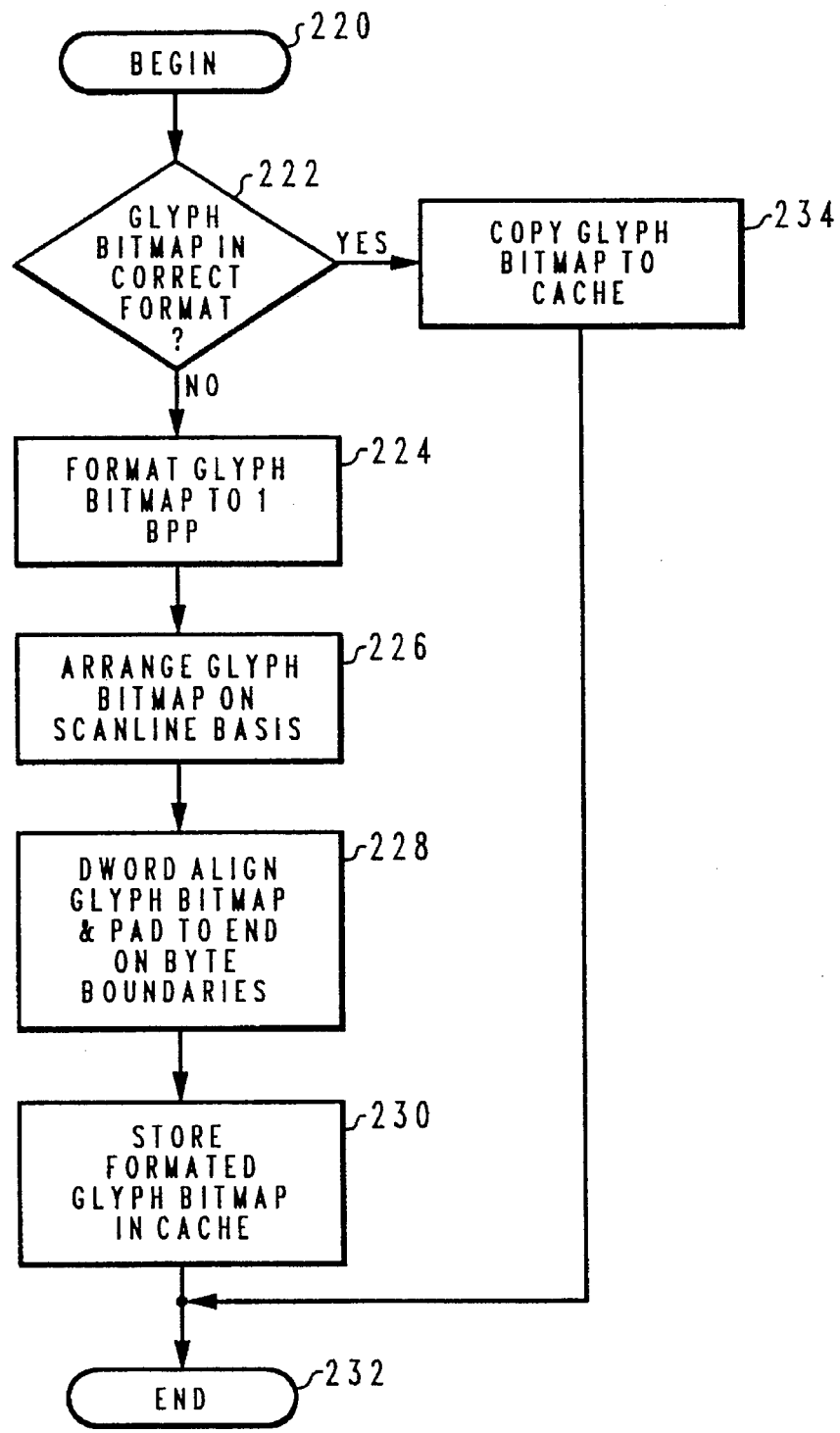
FIG. 9 depicts a flowchart of a process for preprocessing fonts in accordance with a preferred embodiment of the present invention.

Referring now to FIG. 9, a process for preprocessing characters is depicted in accordance with a preferred embodiment of the present invention. This process is executed by the CPU in the data processing system according to the present invention. As illustrated, the process begins in block 220 and thereafter, a determination of whether the glyph bitmap is in a correct format is made block 222. If the glyph bitmap is not in the correct format, the process then formats the glyph bitmap to a one bpp, as depicted in block 224. Thereafter, the glyph bitmap is arranged on a scanline basis such that only one column of scanlines is created for the glyph bitmap of the character, as illustrated in block 226.

The process then dword (on a 32 bit boundary) aligns the glyph bitmap and adds any necessary padding to the end on byte boundaries, as depicted in block 228. Padding is added in the form of zeros in the depicted embodiment. Thereafter, the formatted glyph bitmap is stored in a cache in system memory, as depicted in block 230. The process thereafter terminates as illustrated in block 232. Referring back to block 222, if the glyph bitmap is already in the correct format, the process then copies the glyph bitmap to the cache in system memory, as depicted in block 234, with the process again terminating in block 232.

Figure 10:
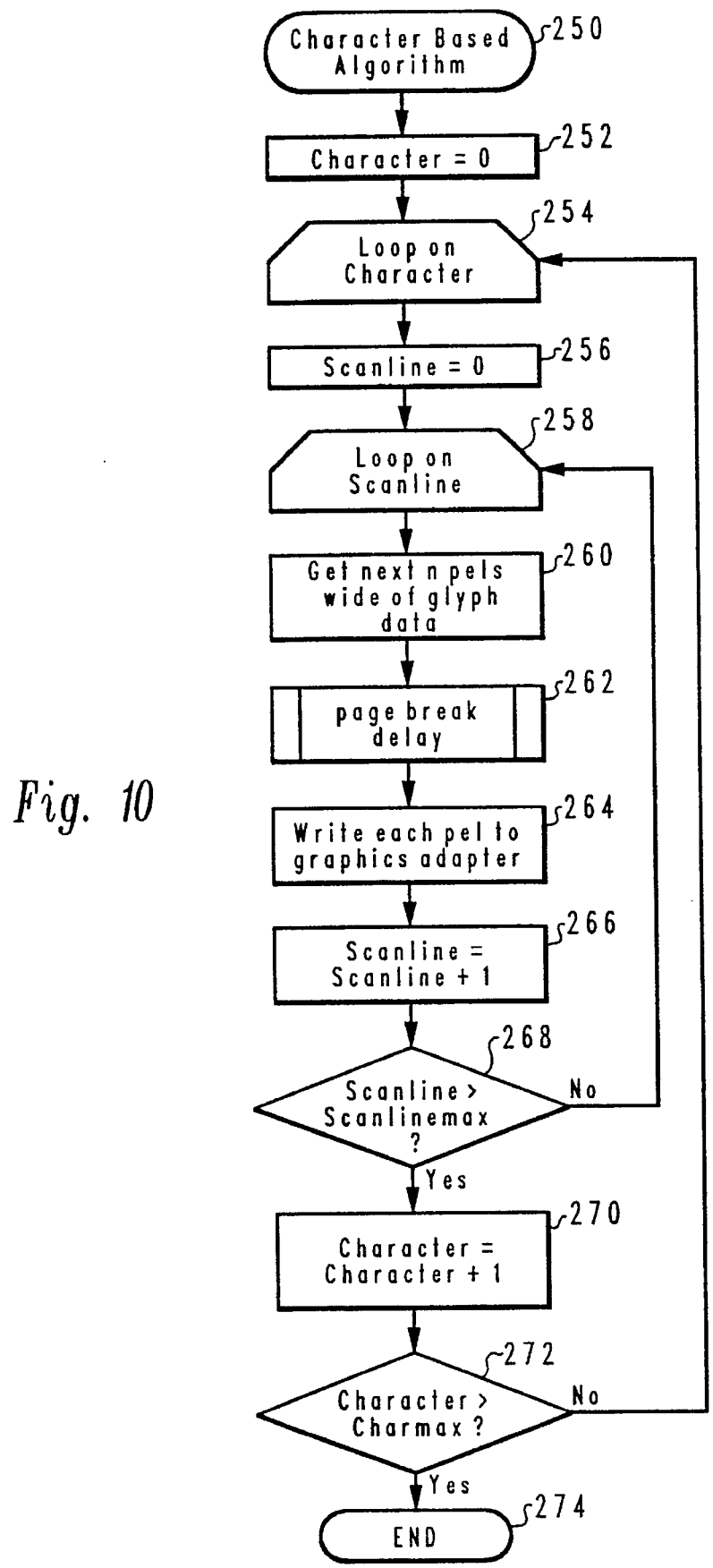
FIG. 10 is a flowchart of a process for sending glyph bitmaps to a graphics adapter in a character oriented process in accordance with a preferred embodiment of the present invention.

Referring now to FIG. 10, a flowchart of a character oriented process of sending glyph bitmaps to a graphics adapter in block 244 is depicted in FIG. 8 in accordance with the preferred embodiments of the present invention. The process depicted in this figure sends glyph bitmaps to the graphics adapter that are cached in the system memory, instead of in off-screen video memory in the frame buffer. The process begins at block 250 and thereafter the character variable is set to zero, as illustrated in block 252. Thereafter, a return for a decision block involving the Character variable is depicted in block 254. The variable Scanline is set to zero, as illustrated in block 256. A return for a return from a decision block involving the Scanline variable, as depicted in block 258.

Afterward, the next "n" pels wide of glyph bitmap data is obtained, as illustrated in block 260. In a character oriented process, "n" is a dword in the depicted embodiment; "n" is selected as the width of a scanline in accordance with a preferred embodiment of the present invention. Thereafter, a page break delay occurs, as illustrated in block 262. This delay is 80 nanoseconds in the depicted example. Each pel is written in the graphics adapter, as depicted in block 264. The pels in the depicted embodiment are written at a rate of 40 nanoseconds per pel. Thereafter, the Scanline is incremented by one, as illustrated in block 266. Next, a determination of whether or not Scanline is greater than Scanlinemax is made, as depicted in block 268. If the answer to this determination is no, the process returns to block 258. If, however, Scanline is greater than Scanlinemax, Character is incremented by one, as illustrated in block 270. Thereafter, a determination of whether or not Character is greater than Charmax is made, as depicted in block 272. If the answer is no, the process returns to block 254. Otherwise, the process terminates as illustrated in block 274.

In accordance with a preferred embodiment of the present invention, a string oriented process also may be employed in displaying characters. The string oriented process of the present invention processes a character string a scanline at a time. An entire string of characters is processed a scanline at a time in the string oriented process. In other words, a single scanline for all of the characters is sent to the graphics adapter for display before the next scanline is begun. This type of process allows the graphics adapter to take maximum advantage of memory page mode.

Figure 11:
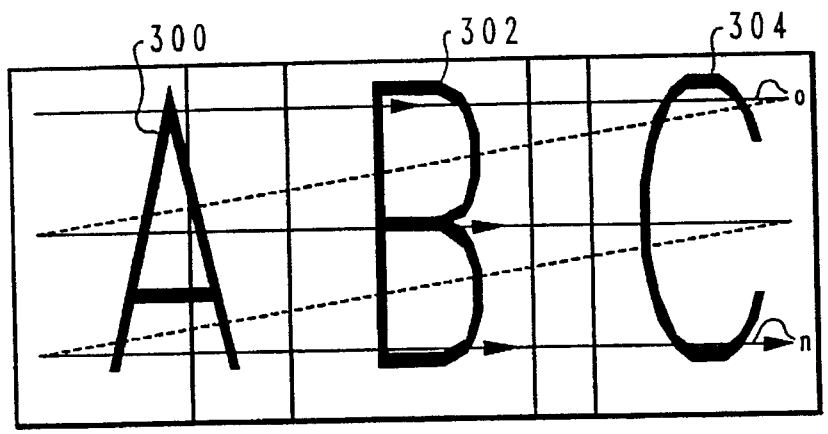
FIG. 11 depicts an illustration of a string oriented process for sending glyph bitmaps from system memory to the graphics adapter in accordance with a preferred embodiment of the present invention.

Unlike the character oriented process, the CPU collects data for a specific scanline for each character in the string before it advances to the next scanline as shown in FIG. 11. Characters A300, B302, and C204 are displayed as a group one scanline at a time from scanline 0 to scanline n until all three characters have been rendered on the display. This process increases the load on the CPU because of the more sophisticated programming sequence, and because of the scattered nature of the data to be gathered.

Figure 12:
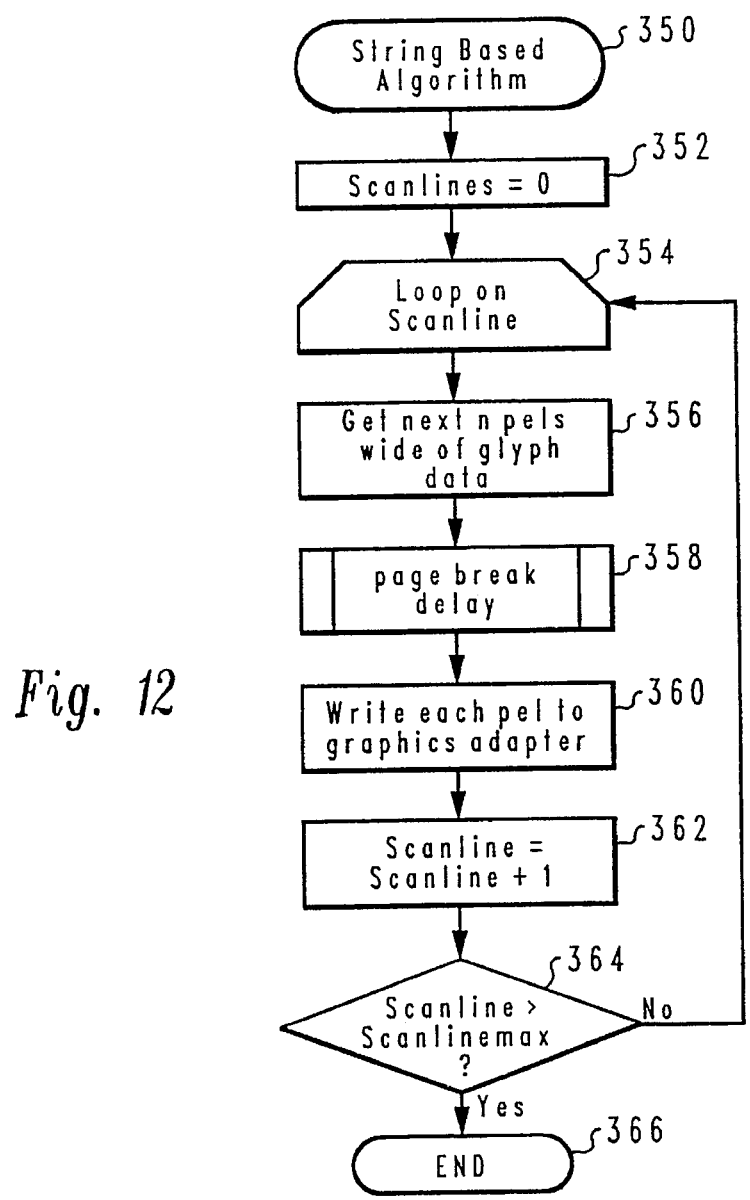
FIG. 12 is a flowchart of a process for sending glyph bitmaps from system memory to the graphics adapter in a string oriented process in accordance with a preferred embodiment of the present invention.

Referring now to FIG. 12, a flowchart of a string oriented process for sending glyph bitmap data from system memory to the graphics adapter is depicted in accordance with a preferred embodiment of the present invention. As illustrated, the process begins at block 350 and thereafter the Scanline variable is set to zero, as illustrated in block 352. Next, a return for a decision block involving Scanline is depicted in block 354.

Thereafter, the next "n" pels wide of glyph bitmap data is obtained, as illustrated in block 356. In the string oriented process, "n" is the number of pels for an entire scanline. Next, a page break delay occurs, as depicted in block 358. Each pel is then written to the graphics adapter from system memory as illustrated in block 360. Thereafter, the Scanline is incremented by one, as depicted in block 362. Next, a determination of whether or not Scanline is greater than Scanlinemax is performed, as illustrated in block 364. If the answer is no, then the process returns to block 354. Otherwise, the process terminates as illustrated in block 364.

The data processed by the character oriented process and the string oriented process may require preprocessing by the CPU. The CPU is employed to preprocess fonts by placing the data representing the fonts and storing them in a cache set up in system memory. The data is stored in the cache so that an entire character or string of characters may be copied from the cache to the graphics adapter on a scanline by scanline basis. The characters or string of characters are stored in the cache by scanlines such that no page break occurs.

In the string oriented process, the preprocessing process would be similar to that of the preprocessing for a character oriented process except the glyph bitmap would be arranged on a scanline basis for the entire string of characters to be displayed on a line, instead of a character by character basis in accordance with a preferred embodiment of the present invention.

With respect to the hardware employed, a block transfer of data from system memory to the frame buffer is a function supported by today's graphics adapters. A special version of this function, called "image transfer" or "strides", is available in many graphics processors and aids in optimizing this function. Several graphics processor that currently support strides are the P9100 from Weitek Corporation and the MGA from Matrox corporation. Most of the graphics processors used in high end RISC processors such as the IBM RISC SYSTEM/6000 computers also incorporate the function known as strides. Employing this capability, the graphics processor can move glyph bitmaps utilizing a single REP MOVST (an assembly language instruction found in Intel processors) from system memory and can increase performance of bitmap transfers by over 100 percent in a 80486 25 megahertz CPU based data processing system. In the absence of a strides function, during a bit block transfer, a graphics processor does not know when a new line occurs during a bit block transfer. With a strides function, a width parameter sent to the graphics processor to tells the graphics processor to change scanlines after the selected width has been transferred.

The string oriented process does not require any additional functions in the graphics adapter. Under the string oriented process, a normal bit block transfer is utilized to send data to the graphics adapter. On the other hand, optimal use of the character oriented process requires additional functions in the graphics adapter.

In accordance with the preferred embodiments of the present invention, an extension to the strides/image transfer function is provided to allow for multiple images to be transferred in a side-by-side fashion. With the character oriented process, these multiple images are raster fonts (also called glyph bitmaps) which, when rendered side by side, result in a line of text on the display.

The graphics adapter of the present invention is an extension or special case of strides, which in itself is a special case of memory to screen bit block transfers, which is a transfer of a rectangular region of pixels from system memory to the frame buffer in the graphics adapter. Monochrome bitmaps in system memory are moved to screen through bit block transfers, and the graphic adapter performs a color expansion, clipping, and line breaks in a pipeline fashion before placing the processed bitmap in the frame buffer in accordance with a preferred embodiment of the present invention. At the end of each character, the address registers are automatically set to the beginning of the next character based on character width and inter-character space data until the character string is finished in accordance with a preferred embodiment of the present invention. The reloading of the graphics adapter's address registers for each character is unnecessary in accordance with a preferred embodiment of the present invention.

Under the present invention, fonts are rendered by loading the appropriate registers in the graphics adapter with data such as (1) destination (x,y); (2) character height; (3) character width and inter-character spacing; and (4) number of characters. The process may be started by sending a selected operation code or alternatively, the process may be initiated by placing data in a width register utilized in accordance with a preferred embodiment of the present invention.

Figure 13:
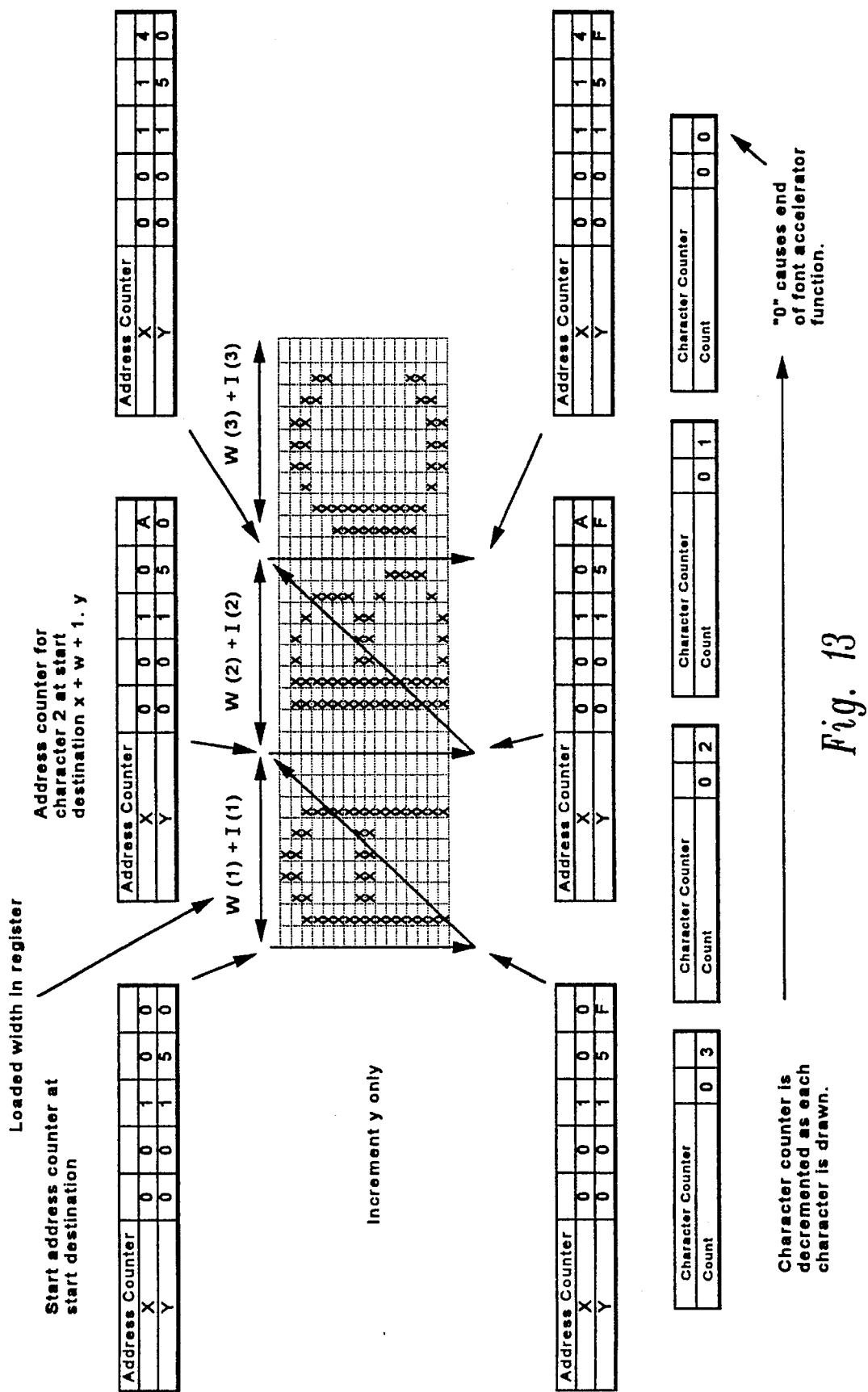
FIG. 13 depicts a diagram of a process in a graphics adapter for displaying characters on a display screen in accordance with a preferred embodiment of the present invention.

Referring now to FIG. 13, a diagram illustrating a process for displaying glyph bitmaps in a graphic adapter in a data processing system employing a character oriented process on a display screen is depicted in accordance with a preferred embodiment of the present invention. The graphics adapter displays fonts one character at a time, from "A" to "C". The number of characters in the depicted example is 3. Thus, at the start of the display process, the character counter is set to 3 and the address counter is set to the beginning address, also called the destination address. Each character has associated with it a width, W(n) and inter-character spacing i(n). When the display process completed, the character counter is equal to zero.

Figure 14:
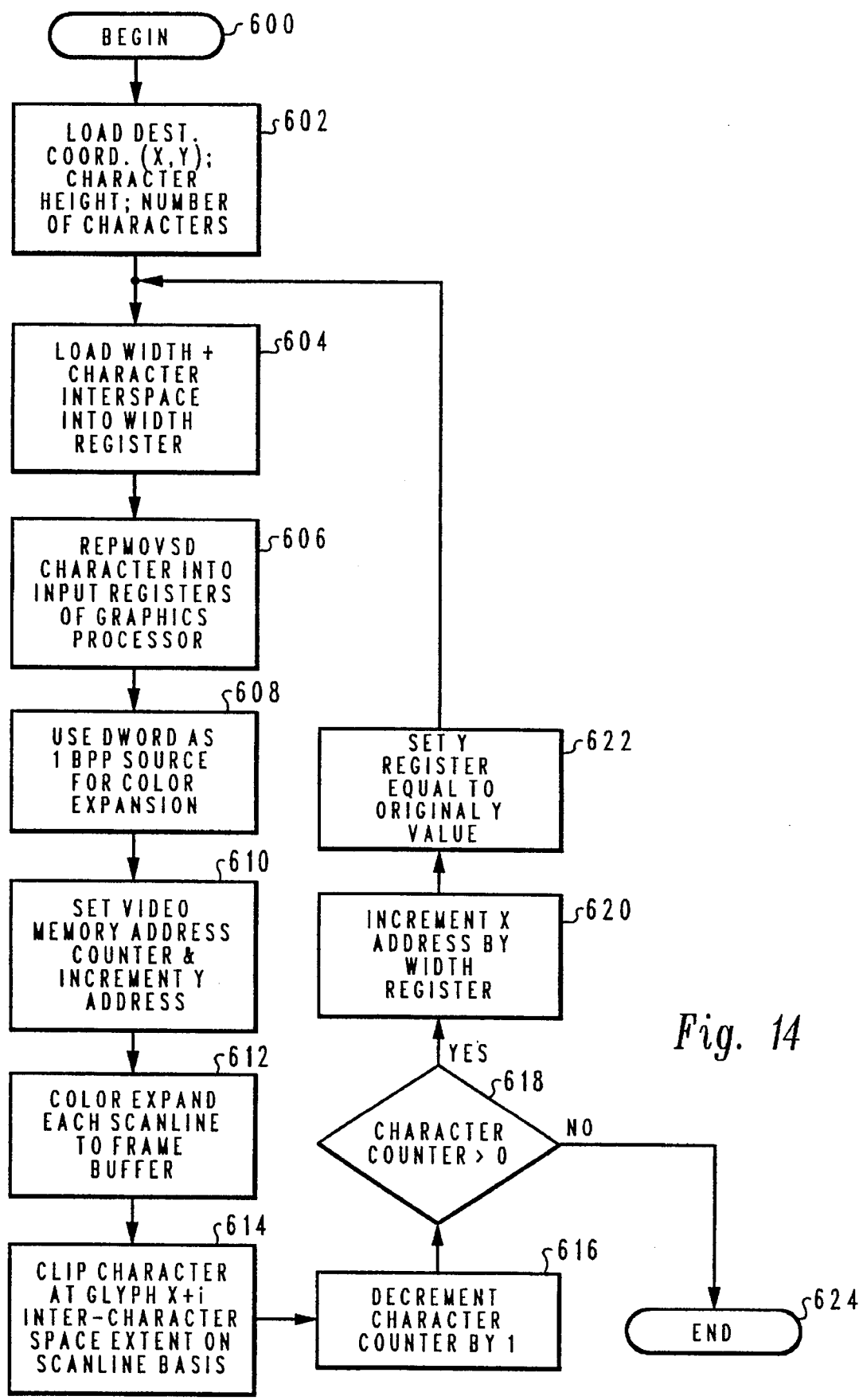
FIG. 14 is a flowchart of a process for displaying characters on a display screen in a graphics adapter in accordance with a preferred embodiment of the present invention.

In accordance with the preferred embodiments of the present invention, FIG. 14 depicts a flowchart of a process employed by the graphics processor in a graphics adapter. The process begins as illustrated in block 600, and thereafter loads the destination coordinates (x,y), character height, number of characters in a string, and then the operation code into the registers of the graphics adapter, as illustrated in block 602.

Next, the character width plus inter-character space is loaded into the width register of the graphics adapter, as depicted in block 604. Then, a REP MOVSD of the character is performed to send glyph bitmap data for the character to the input registers on the processor in the graphics adapter, as illustrated in block 606. The process then takes each dword and utilizes it as a one bit per pel (bpp) source for color expansion, as depicted in block 608. The graphics adapter starts the address counter at the top left of the first character and increments the Y address until the end of the first character, which is equal to the height, as depicted in block 610. Each scanline is color expanded to the display memory in the frame buffer, as illustrated in block 612. Color expansion is a process well known to those of ordinary skill in the art.

In addition, the character is clipped at the glyph x+i inter-character space extent on a scanline basis, as depicted in block 614. Then the character counter is decremented by one, as illustrated in block 616. Thereafter, the character counter is tested to see if it is equal to zero, as depicted in block 618. If the character counter is greater than zero, the x address is incremented by the width register as illustrated in block 620 and the y register is changed back to the original y value, as illustrated in block 622.

The process then iteratively returns to block 604 and the character width and character interspace for the next character is loaded into the width register and this cycle is repeated until all of the characters are displayed. When the character counter is tested at block 618 and found to be equal to zero, the process terminates as illustrated in block 624.

Figure 15:
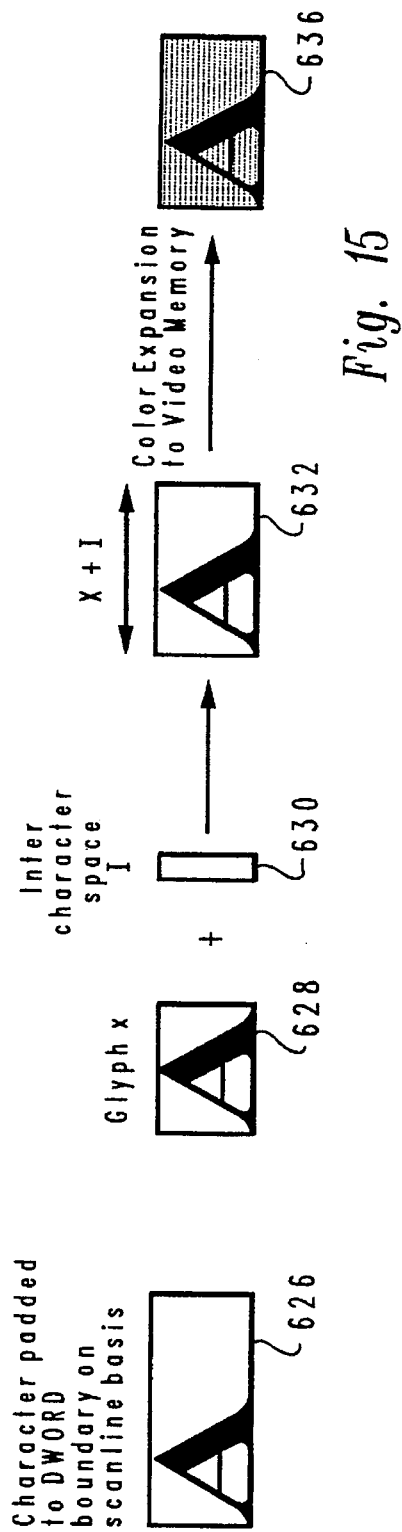
FIG. 15 depicts the processing of a character by a graphics adapter in accordance with a preferred embodiment of the present invention.

Referring next to FIG. 15, a diagram depicting the processing of a character is illustrated in accordance with a preferred embodiment of the present invention. In block 626, the character has been padded to a dword boundary on a scanline basis. Block 628 represents Glyph x for the character and block 630 is the inter-character space I. x+I is shown in block 632 and the resulting character "A" after color expansion to video memory as shown in block 636. Block 636 is the block displayed to the user.

With reference to FIG. 16, a block diagram of registers utilized by a graphics adapter to process characters is depicted in accordance with a preferred embodiment of the present invention. An Op code register 650 may be employed to load an operation code to start the process of displaying characters on the screen using the present invention. A Destination X register 652 and a Destination Y register 654 are utilized to load the starting or destination address of the characters. These two registers give the starting coordinates of the first character to be displayed. A Number of Characters register 656 is employed to tell the graphics adapter how many characters will be processed. The Glyph Height register 658 is utilized to set the height of the character in pels, and a Glyph Width+Inter-character Spacing register 660 is employed to tell the graphics adapter how wide the character and inter-character space are in pels. This information tells the graphics adapter where the character and inter-character space ends in the word to allow for clipping of the unused information.

Alternatively, Op code register 650 need not be added to the graphics adapter. Instead, the loading of data into a register that is utilized only for this type of repetitive data transfer can be employed as a trigger to begin the process. Glyph Width+Inter-character Spacing register 660 may be utilized as the register triggering the process when data is loaded into this particular register in accordance with a preferred embodiment of the present invention.

Op code register 650, Number of Characters register 656, and Glyph Width+Inter-character Spacing register 660 are new registers that would be added to form the graphics adapter of the present invention. Since the actual design and implementation of these registers in hardware is well know to those of skilled in the art, a detailed description of the latches is not provided.

The character oriented process may be utilized without the disclosed graphics adapter to increase speed in displaying fonts (in the form of glyph bitmaps) onto the screen in accordance with a preferred embodiment of the present invention. However, each time a character is sent to a standard graphics adapter, registers must be reloaded to perform a bit block transfer from system memory to the frame buffer. On the other hand, when the character oriented process and the disclosed graphics adapter are combined, the speed of processing increases because the graphics adapter can perform repetitive bit block transfers without having to reload registers each time a new character is to be displayed.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for increasing efficiency in the display of characters on a display within said data processing system, wherein said data processing system includes a system memory and a graphics adapter, said system memory having a page mode, said method comprising:

storing a plurality of characters in said system memory as a plurality of glyph bitmaps, wherein each character has a width and wherein each glyph bitmap for a character is arranged as a column of scanlines such that each scanline within said column of scanlines includes said width of said character; and transmitting selected ones of said plurality of glyph bitmaps from said system memory to said graphics adapter, wherein an occurrence of breaks in said page mode are minimized when said glyph bitmap is moved from said system memory to said graphics adapter, increasing efficiency in displaying characters on a display.

2. The method of claim 1, further comprising transmitting said width of said plurality of characters to said graphics adapter.

3. The method of claim 1, wherein said step of storing each said plurality of characters includes storing each scanline within said column of scanlines as a block of data having a data width that is equal to a data width that is manipulated by a permanent move instruction within a processor in said data processing system.

4. A data processing system for increasing efficiency in the display of characters on a display within said data processing system, wherein said data processing system includes a system memory and a graphics adapter, said system memory having a page mode, said data processing system comprising:

storage means for storing a plurality of characters in said system memory as a plurality of glyph bitmaps, wherein each character has a width and wherein each glyph bitmap for a character is arranged as a column of scanlines such that each of said plurality of scanlines includes said width of said character; and transmission means for transmitting selected ones of said plurality of glyph bitmaps from said system memory to said graphics adapter, wherein an occurrence of breaks in said page mode are minimized when said glyph bitmap is moved from said system memory to said graphics adapter, increasing efficiency in displaying characters on a display.

5. The data processing system of claim 1, further comprising second transmission means for transmitting said width of said plurality of characters to said graphics adapter.

6. The data processing system of claim 4, wherein said column of scanlines has a preselected width.

7. The data processing system of claim 5, said preselected width of said column of scanlines is equal to a width that is manipulated by a permanent move instruction within a processor in said data processing system.

8. The data processing system of claim 4 further including transmission means for sending a destination for said selected ones of said plurality of glyph bitmaps.

9. The data processing system of claim 4, further including graphics processor means for truncating excess data in each scanline within said column of scanlines based on said width of a character.

10. The data processing system of claim 9, wherein said graphics processor means includes truncating excess data in each scanline within said column of scanlines based on said width of a character and on an inter-character space associated with said character.

11. The data processing system of claim 10, wherein said graphics processor means is initiated by a operation code.

12. The data processing system of claim 10, wherein said said width of a character in a preselected register in said graphics processor.

13. The data processing system of claim 12, wherein said graphics processor means includes means for color expansion of each of said selected ones of said plurality of glyph bitmaps.

14. A computer program product stored on a computer readable medium for increasing efficiency in the display of characters on a display within a data processing system, wherein said data processing system includes a system memory and a graphics adapter, said system memory having a page mode, said computer program product comprising:

first instruction means for storing a plurality of characters in said system memory as a plurality of glyph bitmaps, wherein each character has a width and wherein each glyph bitmap for a character is arranged as a column of scanlines such that each said column of scanlines includes said width of said character; and second instruction means for transmitting selected ones of said plurality of glyph bitmaps from said system memory to said graphics adapter, wherein an occurrence of breaks in said page mode are minimized when said glyph bitmap is moved from said system memory to said graphics adapter, increasing efficiency in displaying characters on a display.

15. A data processing system comprising:

a system memory;

a plurality of characters, each character having a width and each character being stored in said system memory as a plurality glyph bitmaps, wherein each glyph bitmap is stored as a column of scanlines and each scanline within said column of scanlines includes said width of a character; and a display;

a graphics adapter, said graphics adapter including a graphics adapter memory and being connected to said display; and transmission means for transmitting selected ones of said plurality of glyph bitmaps from said system memory to said graphics adapter memory, wherein selected ones of said plurality of characters are displayed on said display.

16. The data processing system of claim 15, wherein each of said plurality of characters is stored as a glyph bitmap in a cache in said system memory.

17. The data processing system of claim 15, wherein said transmission means includes:

means for transmitting width and inter-character spacing of a glyph bitmap; and means for transmitting said glyph bitmap a scanline at a time.

18. The data processing system of claim 17, wherein said graphics adapter includes a first register for receiving glyph width and inter-character spacing data.

19. The data processing system of claim 18, wherein said graphics adapter includes a second register for receiving glyph height data.

20. The data processing system of claim 19, wherein said transmission means further includes means for transmitting glyph height data to said second register.

21. The data processing system of claim 18, wherein said graphics adapter includes a third register for receiving a number of characters to be transmitted.

22. The data processing system of claim 21, wherein said transmission means further includes means for transmitting a number of characters to said third register.

23. The data processing system of claim 22, wherein said graphics adapter includes a fourth register for receiving a destination for said selected ones of said plurality of characters.

24. The data processing system of claim 23, wherein said transmission means further includes means for transmitting a destination for said selected ones of said plurality of characters to said fourth register.

25. The data processing system of claim 24, wherein said graphics adapter includes graphics processor means for truncating excess data in each scanline within said column of scanlines based on said width of a character.

26. The data processing system of claim 25, wherein said graphics processor means includes truncating excess data in each scanline within said column of scanlines based on said width of a character and on an inter-character space associated with said character.

27. A graphics adapter comprising:

a graphics processor;

a first register for receiving glyph width data;

a second register for receiving glyph height data;

a third register for receiving a number of characters;

a fourth register for receiving a destination for said plurality of characters;

a memory for receiving a glyph bitmap, said glyph bitmaps represents a character having a width and wherein said glyph bitmap received in the form of a column of scanlines, each scanline having a scanline width that encompasses said width of said character; and first graphics processor means for displaying a glyph bitmap on a display connected to said graphics adapter.

28. The graphics adapter of claim 27, further including second graphics processor means for truncating excess data in each scanline within said column of scanlines based on said width of said character.

29. The graphics adapter of claim 28, wherein said first register also is for receiving for inter-character spacing data.

30. The graphics adapter of claim 29, wherein said second graphics processor means further includes truncating excess data in each scanline within said column of scanlines based on said width of said character and on an inter-character space associated with said character.

31. The graphics adapter of claim 28, wherein said second graphics processor means is initiated by a reception of an operation code in an operation code register.

32. The graphics adapter of claim 28, wherein said second graphics processor means is initiated by a reception of glyph width data in said first register.

33. A method and a data processing system for displaying characters on a display within said data processing, wherein said data processing includes a system memory and a graphics adapter, said system memory having a page mode, said method comprising:

(a) storing a plurality of characters in said system memory as a plurality of glyph bitmaps, each of the plurality of characters associated with a glyph bitmap has a width and an intercharacter spacing, wherein each glyph bitmap for a character is arranged as a column of scan lines and wherein each scan line has a scan line width equal to every other scan line in the column of scan lines and said width of a character is less than or equal to said scan line width of the bitmap in which the character is stored;

(b) transmitting a width of a first character to be transmitted and an intercharacter spacing;

(c) transmitting scan lines until the width of a character being transmitted changes from a width of a prior character;

(d) transmitting scan lines until the intercharacter spacing of a character being transmitted changes from the width of a prior character;

(e) transmitting a new width in response to a change in said width of the character begin transmitted;

(f) transmitting a new intercharacter spacing in response to a change in said intercharacter spacing of said character being transmitted; and (g) repeating steps (c–f) until said selected one of said plurality of glyph bitmaps are transmitted, wherein an occurrence of breaks in said page mode are minimized when said glyph bitmap is moved from said system memory to said graphics adapter.

34. The method of claim 33, wherein said step of storing a plurality of characters includes storing each scan line within said column of scan lines as a block of data having a data width that is equal to a data width that is manipulated by a permanent move instruction within a processor in said data processing system.

35. The data processing system of claim 34, further including graphic processor means for truncating excess data in each scan line within said column of scan lines based on said width of the character.

\* \* \* \* \*